United States Patent
Carlstedt et al.

(10) Patent No.: US 9,081,630 B2
(45) Date of Patent: Jul. 14, 2015

(54) HARDWARE-IMPLEMENTED SEMAPHORE FOR RESOURCE ACCESS BASED ON PRESENCE OF A MEMORY BUFFER IN A MEMORY POOL

(71) Applicant: Wind River Systems, Inc., Alameda, CA (US)

(72) Inventors: Markus Carlstedt, Uppsala (SE); Kenneth Jonsson, Sollentuna (SE); Rikard Mendel, Stockholm (SE)

(73) Assignee: WIND RIVER SYSTEMS, INC., Alameda, CA (US)

( * ) Notice: Subject to any disclaimer, the term of this patent is extended or adjusted under 35 U.S.C. 154(b) by 390 days.

(21) Appl. No.: 13/712,496

(22) Filed: Dec. 12, 2012

(65) Prior Publication Data
US 2014/0165073 A1    Jun. 12, 2014

(51) Int. Cl.
| | |
|---|---|
| *G06F 9/52* | (2006.01) |
| *G06F 9/46* | (2006.01) |
| *G06F 9/48* | (2006.01) |
| *G06F 9/54* | (2006.01) |
| *G06F 15/16* | (2006.01) |

(52) U.S. Cl.
CPC ........ *G06F 9/526* (2013.01); *G06F 9/46* (2013.01); *G06F 9/48* (2013.01); *G06F 9/52* (2013.01); *G06F 9/54* (2013.01); *G06F 15/16* (2013.01)

(58) Field of Classification Search
None
See application file for complete search history.

(56) References Cited

U.S. PATENT DOCUMENTS

| | | | | |
|---|---|---|---|---|
| 5,276,886 | A * | 1/1994 | Dror | 710/240 |
| 5,669,002 | A * | 9/1997 | Buch | 710/200 |
| 6,018,785 | A * | 1/2000 | Wenniger | 710/200 |
| 6,874,049 | B1 * | 3/2005 | Wyland | 710/260 |
| 2002/0016879 | A1 * | 2/2002 | Miller | 710/200 |
| 2003/0115476 | A1 * | 6/2003 | McKee | 713/193 |
| 2003/0135537 | A1 * | 7/2003 | Mikael et al. | 709/103 |
| 2003/0149820 | A1 * | 8/2003 | Kolinummi et al. | 710/200 |
| 2003/0221071 | A1 * | 11/2003 | McKenney et al. | 711/152 |
| 2004/0221246 | A1 * | 11/2004 | Emerson et al. | 716/1 |
| 2005/0166206 | A1 * | 7/2005 | Parson | 718/104 |
| 2005/0182877 | A1 * | 8/2005 | Sweet | 710/240 |
| 2005/0240585 | A1 * | 10/2005 | Makhervaks et al. | 707/8 |
| 2006/0031844 | A1 * | 2/2006 | Dice et al. | 718/106 |
| 2006/0136640 | A1 * | 6/2006 | Tuan | 710/260 |
| 2007/0094430 | A1 * | 4/2007 | Speier et al. | 710/200 |
| 2007/0271450 | A1 * | 11/2007 | Doshi et al. | 712/245 |
| 2008/0244596 | A1 * | 10/2008 | Mansker et al. | 718/104 |
| 2009/0307442 | A1 * | 12/2009 | Singh | 711/154 |
| 2013/0312007 | A1 * | 11/2013 | Millman | 718/106 |

* cited by examiner

*Primary Examiner* — Emerson Puente
*Assistant Examiner* — Benjamin Wu
(74) *Attorney, Agent, or Firm* — Fay Kaplun & Marcin, LLP

(57) ABSTRACT

A method includes receiving a request to access a resource; determining a presence of a memory buffer in a hardware-assisted memory pool; and determining a response to the request to access the resource based on the presence of the memory buffer. A system includes a plurality of processors, a resource, and a hardware-assisted memory pool including a memory buffer; one of the plurality of processors receives a request to access the resource, determines a presence of the memory buffer, and determines a response to the request to access the resource based on the presence of the memory buffer.

13 Claims, 3 Drawing Sheets

HARDWARE-IMPLEMENTED SEMAPHORE FOR RESOURCE ACCESS BASED ON PRESENCE OF A MEMORY BUFFER IN A MEMORY POOL

BACKGROUND

Semaphores are often used to control access to computing resources. Typically, semaphores are implemented using a software routine that uses a counter. In a multi-core system such a counter is shared between the cores and causes a severe performance penalty as the number of cores increase.

SUMMARY OF THE INVENTION

The present invention is directed to a method including receiving a request to access a resource; determining a presence of a memory buffer in a hardware-assisted memory pool; and determining a response to the request to access the resource based on the presence of the memory buffer.

The present invention is further directed to a system including a plurality of processors, a resource, and a hardware-assisted memory pool including a memory buffer. One of the plurality of processors receives a request to access the resource, determines a presence of the memory buffer, and determines a response to the request to access the resource based on the presence of the memory buffer.

The present invention is further directed to a tangible computer-readable storage medium including a set of instructions that is executable by a processor to cause the processor to perform operations including receiving a request to access a resource; determining a presence of a memory buffer in a hardware-assisted memory pool; and determining a response to the request to access the resource based on the status of the memory buffer.

DETAILED DESCRIPTION

Figure 1:
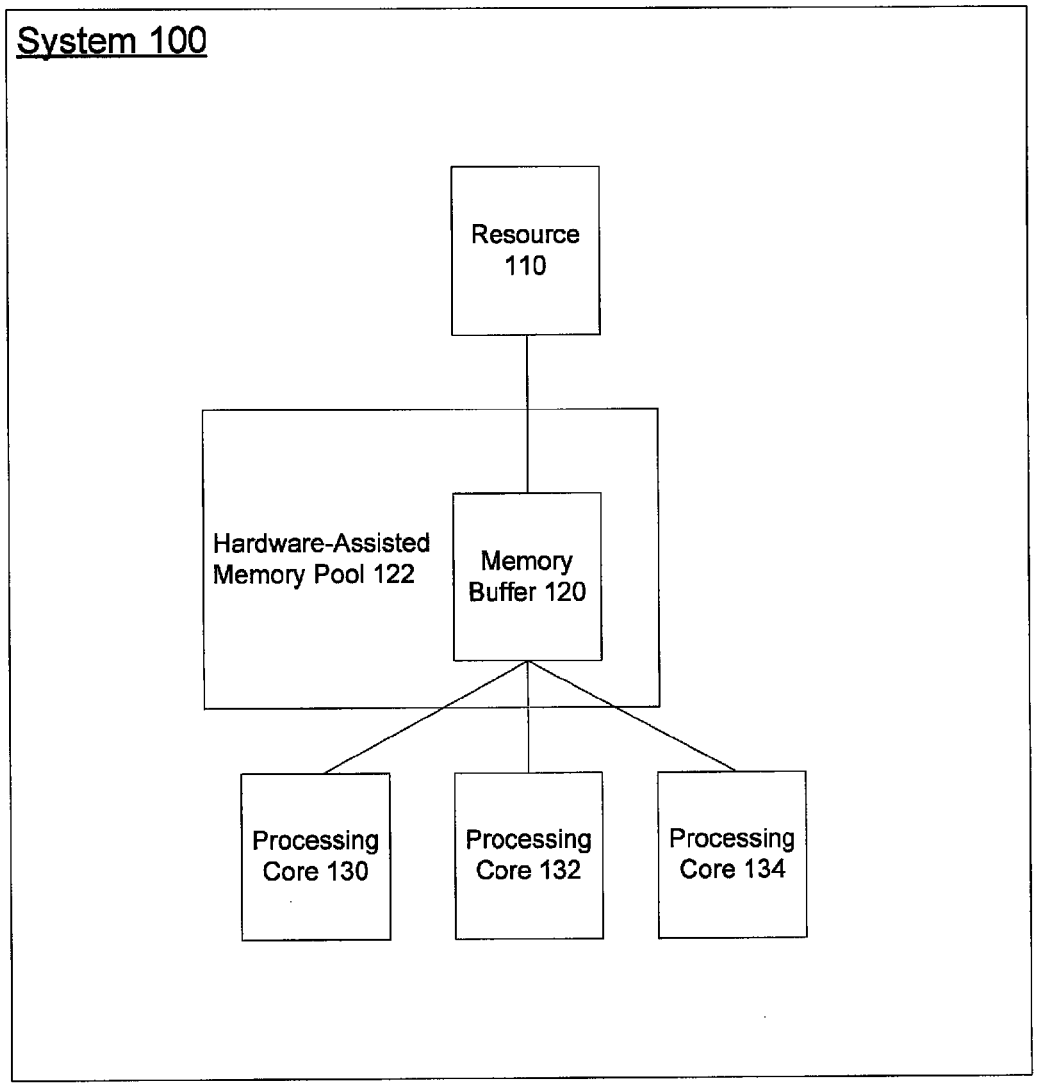
FIG. 1 shows a schematic view of a system including hardware-assisted semaphores according to an exemplary embodiment.

The exemplary embodiments may be further understood with reference to the following description of exemplary embodiments and the related appended drawings, wherein like elements are provided with the same reference numerals. Specifically, the exemplary embodiments relate to methods and systems for implementing hardware-assisted semaphores, which may enable the performance of multi-core systems to achieve better scalability of performance.

Commonly, computing systems may use semaphores or locks to control access to resources. The resource protected in this manner may be any type of computing resource that may need to be accessed by multiple cores and/or multiple processing threads, such as a network interface, a device port, etc. In a typical system, semaphores are implemented using a counting variable that is decremented each time access to a controlled resource is granted, and incremented when a grantee no longer needs access to the resource; when the counter reaches zero, the resource is unavailable. In a multi-core system, the counter is shared between the cores, and when the counter is updated, bus bandwidth must be used to maintain cache coherency between the cores. As the number of cores increases, so too does the amount of bus bandwidth that is used solely for synchronization. As a result, a performance penalty is incurred, particularly as the number of cores increases beyond four.

FIG. 1 illustrates a system 100 that makes use of hardware-assisted semaphores according to an exemplary embodiment. The exemplary system 100 may be implemented in a computing environment that includes hardware-assisted buffer pools; such pools offer a lock-less way to allocate memory, thereby allowing different cores to retrieve memory (e.g., packet buffers) from the same pool in a scalable fashion. Though computing systems including hardware-assisted buffer pools are known in the art, the exemplary embodiments described herein present a novel application for such buffer pools.

The system 100 includes a resource 110, which may be any computing resource (e.g., a port, a device, a network interface, an input/output interface, a data storage element such as a hard drive, etc.) that is to be restricted from multiple simultaneous accesses. Access to the resource 110 is governed by memory buffer 120 residing within hardware-assisted memory pool 122, that is, in a hardware register rather than in general memory address space. As noted above, hardware-assisted memory pools such as the hardware-assisted memory pool 122 are a feature of many modern computing systems, but are generally used for memory allocation rather than in accordance with the exemplary embodiments described herein.

In the exemplary system 100, the function being performed by the memory buffer 120 is that of a binary semaphore; in other embodiments, as will be discussed below, the function of a counting semaphore can also be performed. In the exemplary embodiment wherein the function is that of a binary semaphore, the memory pool 122 includes one memory buffer 120. If the memory buffer 120 is available for access in the memory pool 122, the resource 110 is available for access; conversely, if no memory buffer 120 is available for access within the memory pool 122, the resource 110 is unavailable. In another embodiment, a resource 110 may be accessible by a number of simultaneous takers N. In such an embodiment, the memory pool 122 may include a quantity N of memory buffers 120 in order to control access to such a resource.

The system 100 also includes a plurality of processing cores 130, 132 and 134. Those of skill in the art will understand that the illustration of three cores is only exemplary, and that the broader principles described by the exemplary embodiments may be equally applicable to systems with any number of processing cores. Each of the processing cores 130, 132 and 134 is capable of accessing the hardware-assisted memory pool 122 to examine the presence of memory buffers 120 and, thereby, determine the state of the resource 110.

Figure 2:
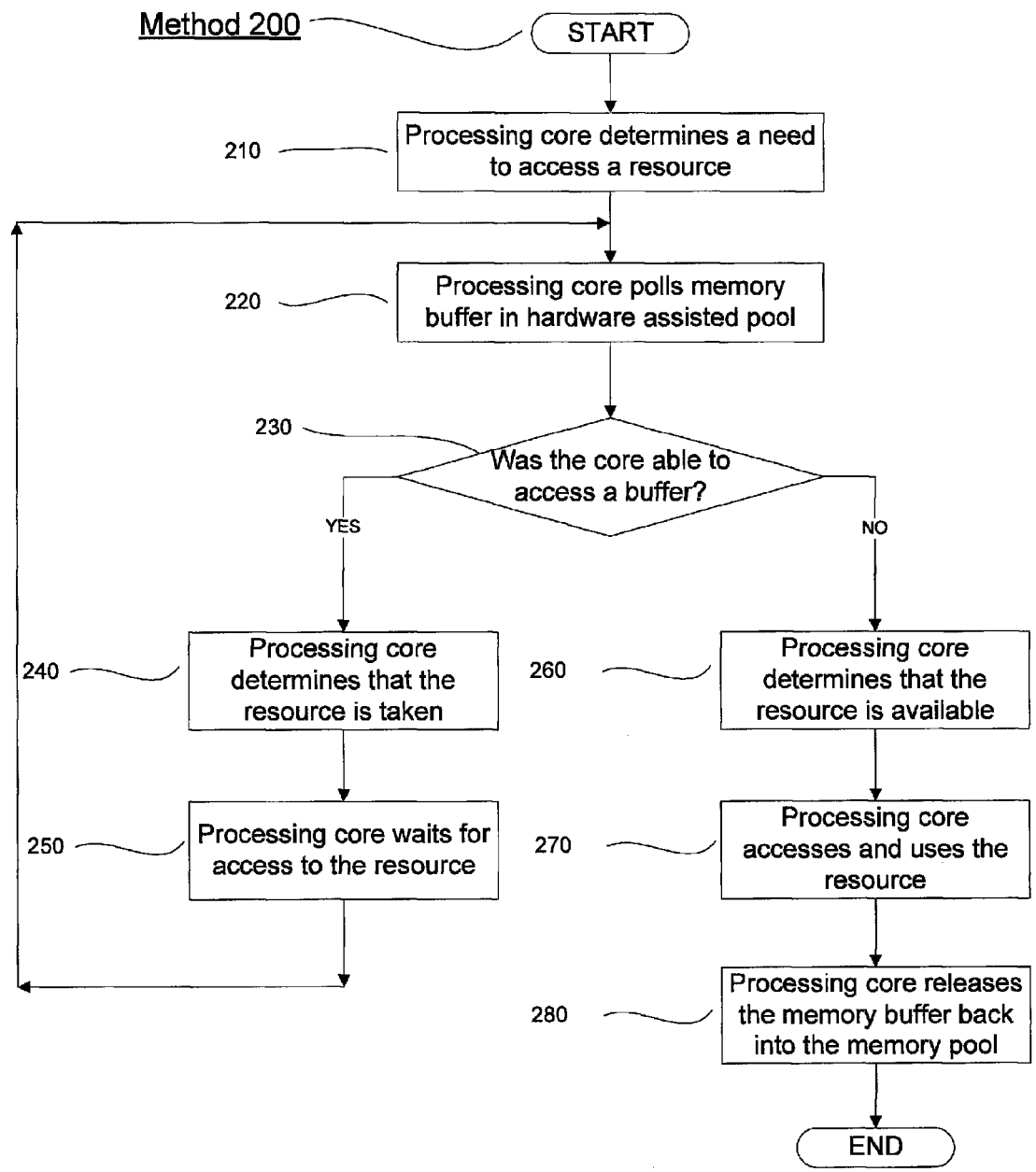
FIG. 2 shows an exemplary method for implementing hardware-assisted semaphores according to an exemplary embodiment.

FIG. 2 illustrates an exemplary method 200 by which a processing core or other taker may attempt to access a resource that is controlled by a hardware assisted semaphore, as described above. The method 200 will be described with reference to the elements of the system 100, but those of skill in the art will understand that this is only exemplary. As described above, the memory pool 122 of the exemplary embodiment contains a single memory buffer 120, indicating that the resource 110 is not being used (or, for a resource 110 that can be accessed by a plurality of simultaneous takers, the memory pool 122 contains a number N of memory buffers 120 equal to the number of takers that can access the resource 110 simultaneously). It will be apparent to those of skill in the art that when the system 100 is initialized, the memory pool 122 will contain the initial quantity of memory buffers 120 as described above (i.e., one memory buffer 120 for a binary semaphore, N memory buffers 120 for a counting semaphore). However, the method 200 will be described at a generic point in time during the operation of the system 100.

In step 210, processing core 130 identifies a need to access resource 110. It will be apparent to those of skill in the art that this need may be determined in any manner of ways and for a wide variety of reasons, depending on the task being performed by the processing core 130 and the nature of the resource 110. However, the performance of the method 200 may be substantially similar regardless of the nature of the need for the resource 110. In step 220, the processing core 130 queries the memory pool 122 (e.g., by invoking a semaphore API operative to query the memory pool 122) to determine the presence of a memory buffer 120 stored therein.

In step 230, the processing core 130 determines whether it was able to access a memory buffer 120 from memory pool 122. As described above, this will enable the processing core 130 to determine the status of the resource 110, in the manner which will be described herein. The processing core 130 determines whether it was able to obtain a memory buffer 120; this determination may be made in the same manner regardless of whether the semaphore function performed by the memory buffer or buffers 120 of memory pool 122 is that of a binary or counting semaphore. If the processor core 130 was unable to access a memory buffer 120, then the method proceeds to step 240, and the processing core 130 determines that the resource 110 is unavailable for access. In step 250, the processing core 130 waits for access to the resource 110. In one exemplary embodiment, the processing core 130 may make a "get semaphore" call in a "while" loop, which is only exited once the "get semaphore" call succeeds; in another embodiment, the processing core 130 may perform other tasks, rather than looping, and try the "get semaphore" call again at a later time. After the processing core 130 has waited for access (e.g., for a predetermined time or for a time that is configurable based on the priority of the code being executed by the processing core 130), the method returns to step 220, wherein the processing core 130 again queries the memory buffer 120 to retrieve the stored value.

If, in step 230, the processing core 130 was able to get a memory buffer 120 from memory pool 122 (which, as discussed above, may be a substantially similar determination regardless of whether the hardware-assisted semaphore is binary or counting), then the method proceeds to step 260. In step 260, the processing core 130 determines, in contrast to the branch of the method 200 described above, that the resource 110 is available for access by the processing core 130. As discussed above, this determination is based on the fact that the processing core 130 was able to access a memory buffer 120. It will be apparent to those of skill in the art that if the access to the memory buffer 120 by the processing core 130 reduces the number of available memory buffers 120 in the memory pool 122 to zero, a subsequent potential taker of the resource 110, such as processing core 132, that attempts to access the resource 110 through its own performance of method 200 will find no available memory buffers 120 in the memory pool 122, and, therefore, will determine that the resource 110 is unavailable (i.e., will arrive at step 240 of its own performance of method 200).

In step 270, the processing core 130 accesses and uses the resource 110. This step may proceed by standard techniques for using a resource given the nature of the resource 110, in view of the fact that the processing core 130 is already aware that the resource 110 is available for access and, thus, does not need to perform any other tasks (e.g., access a spinlock) to request or determine the ability to access the resource 110. This may involve taking the resource 110, using the resource 110, and releasing control over the resource 110. Once step 270 has been completed and the processing core 130 has released control over the resource 110, the method continues to step 280. In step 280, the processing core 130 releases the memory buffer 120 it accessed in step 230 back into the memory pool 122; this step is performed in the same manner regardless of whether the memory pool 122 initially contained a single memory buffer 120 or a plurality of memory buffers 120. In either case, the result is that the end of access to the resource 110 by processing core 130 has been indicated, and the resource 110 is rendered available for access by a subsequent taker (e.g., processing cores 132 and 134). After step 280, the method 200 terminates.

Figure 3:
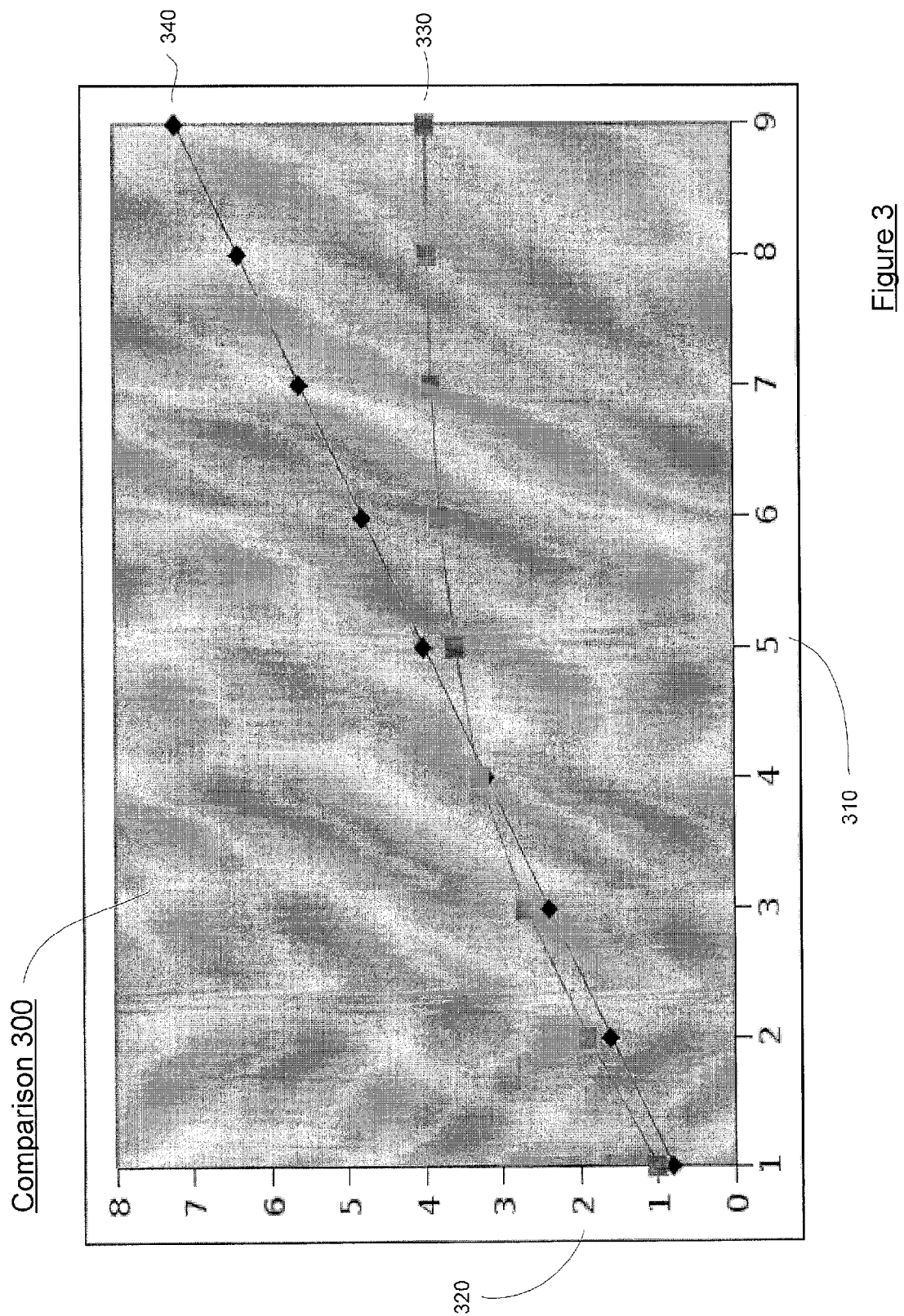
FIG. 3 shows a comparison of the performance of a system using hardware-assisted semaphores according to an exemplary embodiment with a system using software-based semaphores of the prior art.

As described above, the exemplary embodiments replace a software semaphore with a hardware-assisted memory pool containing one or more buffers. Since the hardware-assisted semaphore pool does not use a shared counter, but, rather, uses a hardware-assisted memory pool without the cache coherency issues that cause performance penalties of software semaphores, the performance does not decrease as the number of cores increases. FIG. 3 illustrates a comparison 300 of the performance of a system using hardware-assisted semaphores according to an exemplary embodiment, such as the system 100 of FIG. 1 operating in accordance with the method 200 of FIG. 2, with a system using software-based semaphores of the prior art.

FIG. 3 includes an X axis 310 indicating a number of processing cores present within a system and a Y axis 320 indicating a level of performance of the system. FIG. 3 also includes a first performance curve 330, with points shown by squares, describing the performance of a system using software-based semaphores. As will be apparent to those of skill in the art, the first performance curve 330 shows a dropoff in performance increases once the number of cores increases beyond four. FIG. 3 also includes a second performance curve 340, with points shown by diamonds, describing the performance of an exemplary system using hardware-assisted semaphores. As will be apparent to those of skill in the art, the second performance curve shows a linear increase in performance along the axis 320 as the number of cores increases along the axis 310, with no degradation as the number of cores grows.

Those of skill in the art will understand that the above-described exemplary embodiments may be implemented in any number of matters, including as a software module, as a combination of hardware and software, etc. For example, the exemplary method 200 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:
1. A method, comprising:
  receiving a request to access a resource;
  determining a presence of a memory buffer in a hardware-assisted memory pool;

determining a response to the request to access the resource based on the presence of the memory buffer, wherein the response is one of denying access to the resource based the memory buffer not being present in the hardware-assisted memory pool and allowing access to the resource based on the memory buffer being present in the hardware-assisted memory pool;

responsive to determining that the memory buffer is present in the hardware-assisted memory pool, allowing access to the resource and removing the memory buffer from the hardware-assisted memory pool; and responsive to receiving an indication that the access to the resource is complete, releasing the memory buffer to the hardware-assisted memory pool.

2. The method of claim 1, wherein the resource is capable of access by a single taker.

3. The method of claim 2, wherein the hardware-assisted memory pool includes one memory buffer.

4. The method of claim 1, wherein the resource and the hardware-assisted memory pool are elements of a multi-processor computing system.

5. The method of claim 1, wherein the resource is capable of access by a plurality of simultaneous takers.

6. The method of claim 5, wherein the hardware-assisted memory pool includes a plurality of memory buffers, a quantity of the plurality of memory buffers being equal to a quantity of the plurality of simultaneous takers.

7. The method of claim 1, wherein the resource is one of a port, a device, a network interface, an input/output interface, and a data storage element.

8. A system, comprising:
a plurality of processors;
a resource; and
a hardware-assisted memory pool including a memory buffer, wherein one of the plurality of processors:
receives a request to access the resource;
determines a presence of the memory buffer;
determines a response to the request to access the resource based on the presence of the memory buffer, wherein the response is one of denying access to the resource based the memory buffer not being present in the hardware-assisted memory pool and allowing access to the resource based on the memory buffer being present in the hardware-assisted memory pool;

responsive to determining that the memo buffer is present in the hardware-assisted memory pool, allows access to the resource and removes the memory buffer from the hardware-assisted memory pool; and responsive to receiving an indication that the access to the resource is complete, releases the memory buffer to the hardware-assisted memory pool.

9. The system of claim 8, wherein the resource is capable of access by a single taker.

10. The system of claim 8, wherein the resource is capable of access by a plurality of simultaneous takers.

11. The system of claim 10, wherein the hardware-assisted memory pool includes a plurality of memory buffers, a quantity of the plurality of memory buffers being equal to a quantity of the plurality of simultaneous takers.

12. The system of claim 8, wherein the resource is one of a port, a device, a network interface, an input/output interface, and a data storage element.

13. A non-transitory computer-readable storage medium including a set of instructions that is executable by a processor to cause the processor to perform operations comprising:
receiving a request to access a resource;
determining a presence of a memory buffer in a hardware-assisted memory pool;
determining a response to the request to access the resource based on the presence of the memory buffer, wherein the response is one of denying access to the resource based the memory buffer not being present in the hardware-assisted memory pool and allowing access to the resource based on the memory buffer being present in the hardware-assisted memory pool;

responsive to determining that the memory buffer is present in the hardware-assisted memory pool, allowing access to the resource and removing the memory buffer from the hardware-assisted memory pool; and responsive to receiving an indication that the access to the resource is complete, releasing the memory buffer to the hardware-assisted memory pool.

* * * * *

UNITED STATES PATENT AND TRADEMARK OFFICE
CERTIFICATE OF CORRECTION

PATENT NO. : 9,081,630 B2  Page 1 of 1
APPLICATION NO. : 13/712496
DATED : July 14, 2015
INVENTOR(S) : Carlstedt et al.

It is certified that error appears in the above-identified patent and that said Letters Patent is hereby corrected as shown below:

Claims

Claim 1, Column 5, Line 3:
  "based" should read "based on"

Claim 8, Column 5, Line 40:
  "based" should read "based on"

Claim 8, Column 6, Line 3:
  "the memo" should read "memory"

Claim 13, Column 6, Line 29:
  "based" should read "based on"

Signed and Sealed this
Twenty-second Day of December, 2015

Michelle K. Lee
*Director of the United States Patent and Trademark Office*